United States Patent [19]

Fairchild

[11] Patent Number: 5,363,360
[45] Date of Patent: Nov. 8, 1994

[54] METHOD AND APPARATUS FOR DETECTING AND PROCESSING SYNCHRONIZATION MARKS EXTRACTED FROM A PRERECORDED WOBBLED GROOVE ON A COMPACT DISK

[75] Inventor: Michael G. Fairchild, Webster, N.Y.

[73] Assignee: Eastman Kodak Company, Rochester, N.Y.

[21] Appl. No.: 127,218

[22] Filed: Sep. 27, 1993

[51] Int. Cl.$^5$ .............................................. G11B 7/00
[52] U.S. Cl. ...................................... 369/48; 369/50; 369/54; 369/124
[58] Field of Search ........................ 369/44.13, 47–48, 369/50, 53–54, 58, 59, 109–111, 116, 124

[56] References Cited

U.S. PATENT DOCUMENTS

| | | | |
|---|---|---|---|
| 4,620,300 | 10/1986 | Ogawa | 369/59 |
| 4,908,812 | 3/1990 | Aoshima et al. | 369/59 |
| 4,947,264 | 8/1990 | Narusawa | 369/50 X |
| 5,274,622 | 12/1993 | Kono | 369/116 |

*Primary Examiner*—W. R. Young
*Attorney, Agent, or Firm*—Raymond L. Owens

[57] ABSTRACT

A method and apparatus for detecting and processing synchronization marks extracted from a prerecorded wobbled groove formed in a compact disk in order to produce pseudo-sync signals. The method comprises the steps of: i) extracting an FM signal from the wobbled groove and converting such FM signal into biphase data; ii) extracting a clock signal from the biphase data; iii) detecting in each block of information a predetermined sequence of biphase data representing a sync mark to produce a sync detect signal; iv) generating a time window signal in which, in each block of information, a valid sync detect signal is expected to occur; v) in response to a valid sync detect signal detected within the window signal of a given block of information, generating a pseudo-sync signal in the next block of information; vi) in the case of no valid sync detect signal within the window signal of the given block of information, generating a pseudo-sync signal for the next block of information from the last valid sync detect signal; and vii) indicating a system error when a predetermined number of sync detect signals are not detected within their corresponding time window signal.

5 Claims, 6 Drawing Sheets

METHOD AND APPARATUS FOR DETECTING AND PROCESSING SYNCHRONIZATION MARKS EXTRACTED FROM A PRERECORDED WOBBLED GROOVE ON A COMPACT DISK

FIELD OF THE INVENTION

The present invention relates to the detection, processing and timing of the Absolute Time In Pregroove (ATIP) synchronization marks extracted from a wobbled groove formed in a compact disk such as a Photo CD.

BACKGROUND OF THE INVENTION

Stamped by machine on a writable compact disk is a wobbled groove. The groove provides means for tracking on the disk while writing or reading data that is written in the groove. The wobbled groove, which is a frequency modulated signal after detection and processing, contains addressing and other information that is necessary for the write and read processes of the CD writer/reader.

Information is coded in a series of blocks, each of said blocks comprising 42 bits: four bits of a sync mark, eight bits of "minutes", eight bit of "seconds", eight bits of "frames", and fourteen bits of "CRC" (cyclic redundancy check). The sync marks are used to produce sync signals and these sync signals perform the following functions: (1) They indicate that at a particular location the prerecorded address information is to follow and this information is used to tell the writer/reader where the optical head is operating on the disk. (2) The sync mark establishes a reference point on the compact disk to begin a write or read sequence.

In order to work efficiently, the microprocessor which controls the writer/reader needs to be provided with an uninterrupted synchronization signal, free of invalid or missing synchronization pulses. This is obviously more critical with high speed writers. For those writers, there is an increased likelihood of noise in the detected signals which will cause synchronization marks stamped on the disk to either not be detected or to be falsely detected.

SUMMARY OF THE INVENTION

It is therefore an object of this invention to provide an efficient way to detect, process and time synchronization marks prerecorded on a disk, in order to efficiently control the operation of a high speed writer/reader.

This object is achieved in a method for detecting and processing synchronization marks extracted from a prerecorded wobbled groove formed in a compact disk in order to produce pseudo-sync signals, each pseudo-sync signal enabling a writing/reading sequence on the compact disk of an associated writer/reader, the prerecorded wobbled groove having a plurality of blocks of information, the method comprising the steps of:

(a) extracting an FM signal from the wobbled groove when the disk is rotatably driven and converting such FM signal into biphase data;

(b) extracting a clock signal from the biphase data;

(c) detecting in each block of information a predetermined sequence of biphase data representing a sync mark by using the clock signal and the biphase data to produce a sync detect signal;

(d) generating a time window signal in which, for a given block of information, a valid sync detect signal is expected to occur, the time window signal being generated from a valid sync detect signal of the block preceding the given block;

(e) in response to a valid sync detect signal detected within the window signal of a given block of information, generating a pseudo-sync signal in the next block of information;

(f) in the case of no valid sync detect signal within the window signal of the given block of information, generating a pseudo-sync signal for the next block of information from the last valid sync detect signal; and (g) indicating a system error when a predetermined number of sync detect signals are not detected within their corresponding time window signal.

A further object of the present invention is to provide an apparatus for detecting and processing synchronization marks extracted from a prerecorded wobbled groove formed in a compact disk in order to produce pseudo-sync signals, each pseudo-sync signal enabling a writing/reading sequence on the compact disk of an associated writer/reader, the prerecorded wobbled groove having a plurality of blocks of information, said apparatus comprising:

(a) means for extracting an FM signal from the wobbled groove when the disk is rotatably driven and converting such FM signal into biphase data;

(b) means for extracting a clock signal from the biphase data;

(c) means for detecting in each block of information a predetermined sequence of biphase data representing a sync mark by using the clock signal and the biphase data to produce a sync detect signal;

(d) means for generating a time window signal in which, for a given block of information, a valid sync detect signal is expected to occur, the time window signal being generated from a valid sync detect signal in the block preceding the given block of information;

(e) means for, in response to a valid sync detect signal detected within the window signal of a given block of information, generating a pseudo-sync signal in the next block of information;

(f) means for, in the case of no valid sync detect signal within the window signal of the given block of information, generating a pseudo-sync signal in the next block of information from the last valid sync detect signal; and (g) means for indicating a system error when a predetermined number of sync detect signals are not detected within their corresponding time window signal.

These and other objects of the present invention will become more apparent when taken in conjunction with the following description and drawings wherein like characters indicate like parts and which drawings form a part of the present description.

The following are advantages of the present invention. The method and apparatus according to the invention are particularly advantageous in that high speed reading and writing capabilities are permitted.

At higher rates there will be more invalid detected sync marks, but the system will compensate for these invalid detected sync marks. The present invention will permit a predetermined number of sync marks not to be detected without having to stop the writing/reading process. Other advantages will appear during the detailed description which follows.

DETAILED DESCRIPTION OF THE PREFERRED EMBODIMENTS

Figure 1:
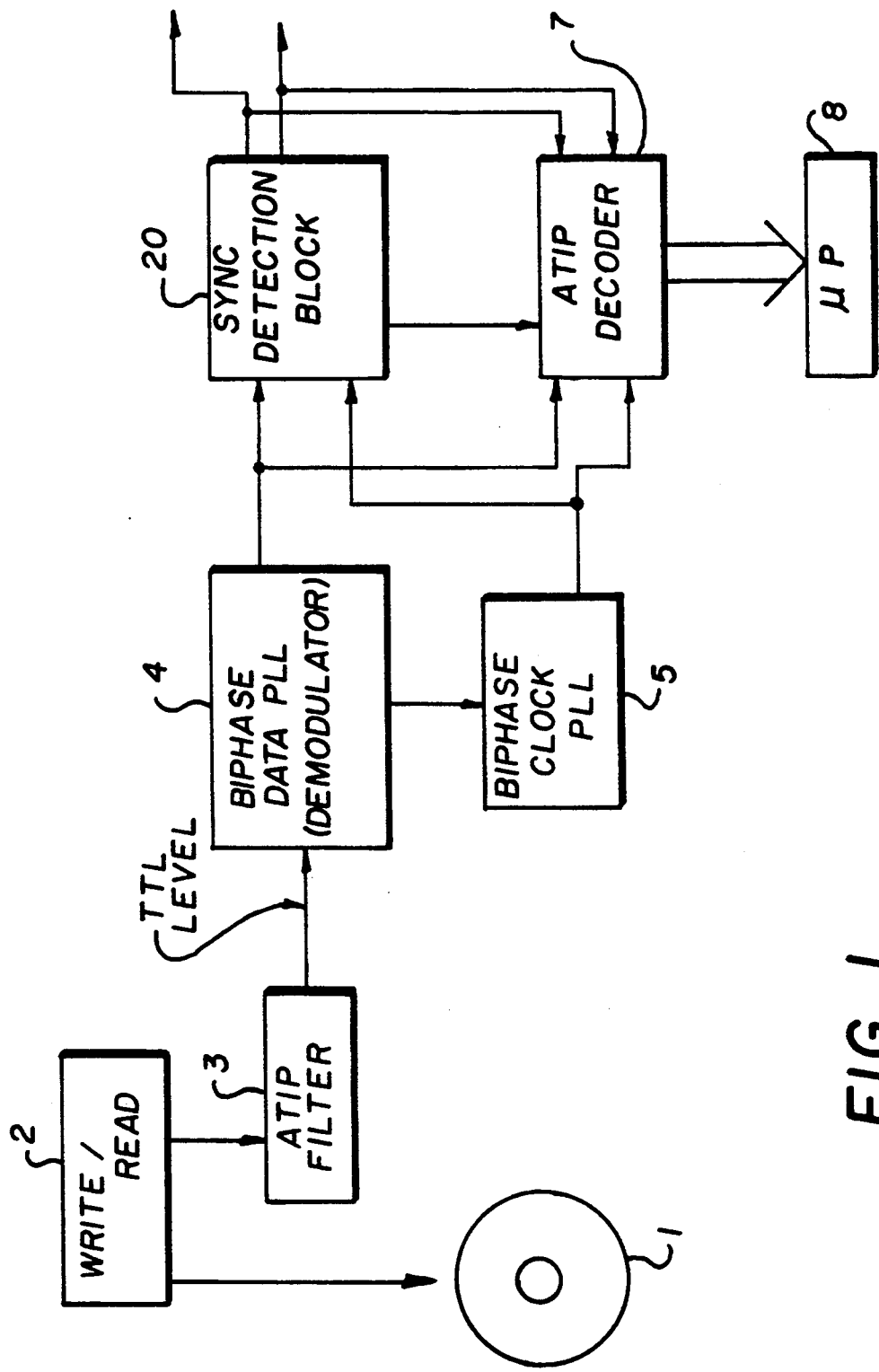
FIG. 1 represents a block diagram of a preferred en%embodiment of the apparatus according to the invention.

FIG. 1 to which it is now made reference, represents a block diagram of the system which is used to carry out the method according to the invention. A prerecorded spiraled wobbled pregroove, starting from the center of a CD-WO (compact disc-write once) disk 1 and extending up to the periphery of the disk is read by a reader/writer 2. Typically, a reader/writer such as the Philips® 2× writer/reader or a writer/reader operating at six times (6×) the standard speed can be used. This pregroove is not a perfect spiral but is wobbled with a typical amplitude of 30 nm and a spatial period of 54 to 64 μm.

This spiraled wobbled pregroove contains ATIP (Absolute Time in Pregroove) tracking information, such as addressing and other information that are necessary for the write and read processes of the CD-WO writer/reader. This ATIP information is encoded in blocks of 42 bits: 4 bits of synchronization (Mark); 24 bits of address (8 bits of minutes; 8 bits of seconds and 8 bits of frames); and 14 bits of CRC (cyclic redundancy check) which are used for error detection.

Figure 2:
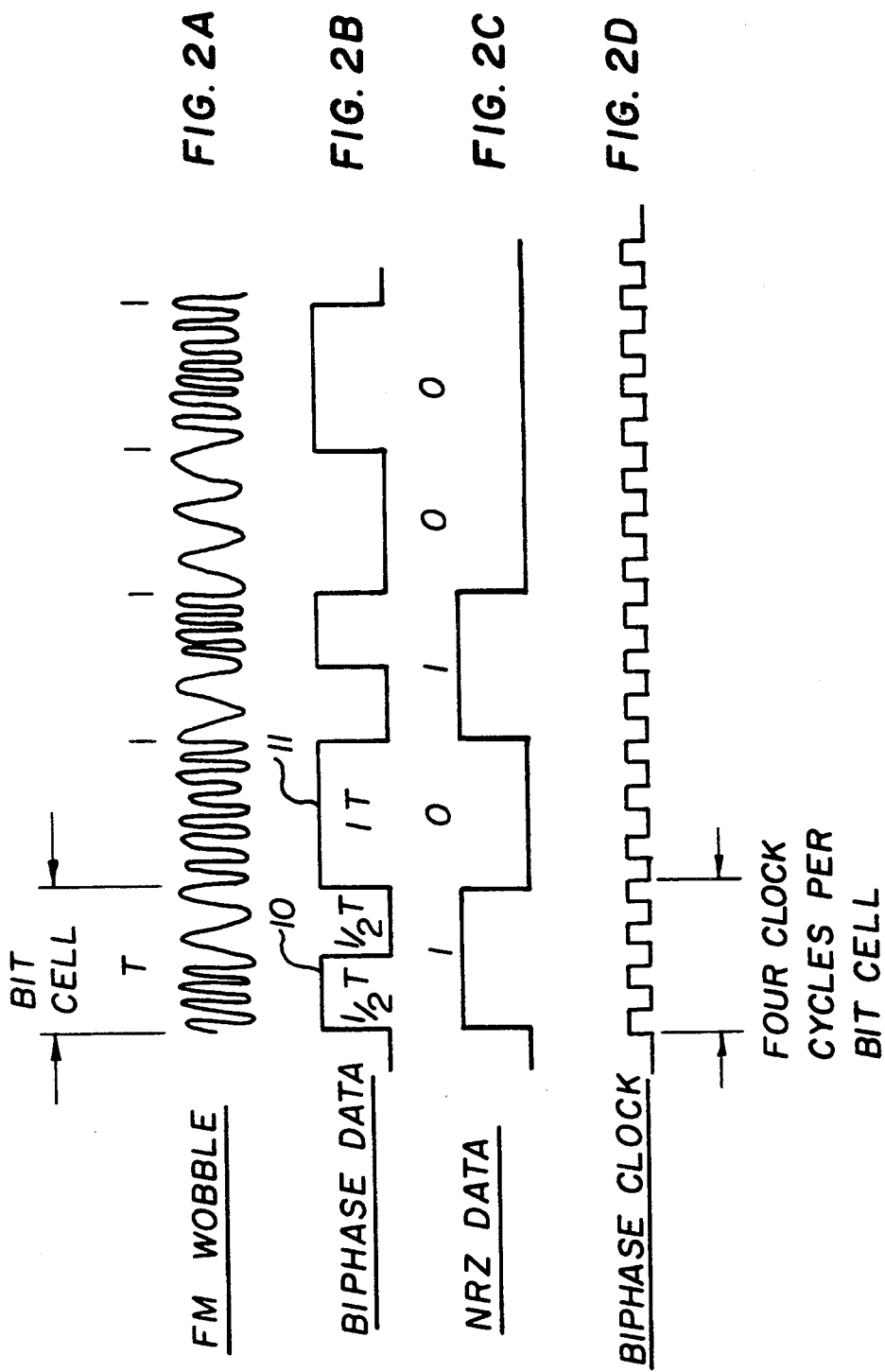
FIGS. 2A-2D illustrate different signals which are used for generating the synchronization signals with the method according to the invention.

A FM (frequency modulated) signal is produced from the reading of the spiral wobbled groove. This signal is shown in FIG. 2A. On this representation the frequency differences have been exaggerated in FIG. 2A to better show the modulation of the signal. The FM signal is amplified to produce a narrow band, frequency modulated TTL level signal and filtered within an ATIP filter 3. The signal issued from the ATIP filter 3 is then sent to a phase locked loop (PLL) 4 known as a demodulator which outputs an error voltage which is the difference between the frequency modulated input and a voltage controlled oscillator output. The error voltage is digitized to produce biphase data (see FIG. 2B). This biphase data is processed and sent to a biphase clock PLL (phase locked loop) 5 to extract a biphase clock (FIG. 2D). For each bit within the biphase data, there are four clock cycles. Every four clock cycles indicate a bit cell. The biphase data are then decoded to produce NRZ data. This decoding is performed in the ATIP decoder which will be discussed hereafter in detail. The biphase rules which are typically used for producing the NRZ data (FIG. 2C) are the following: a transition in the middle of a bit cell (10, FIG. 2B) is a "one"; no transition in a bit cell (11, FIG. 2B) is a "zero"; a transition must occur at each bit cell edge. Thus "legal" lengths (½ T and T) of biphase data normally exist. A third length, designated as "illegal" (1½T) is used to detect a sync mark which will be discussed in detail hereafter. To determine where the ATIP data exists, it is necessary to detect a sync mark. In fact, according to a preferred embodiment the end of a sync mark will be detected to indicate the beginning of the address information. The sync mark signal is detected in a sync detection block 20 which will be discussed in greater detail hereafter.

Figure 3:
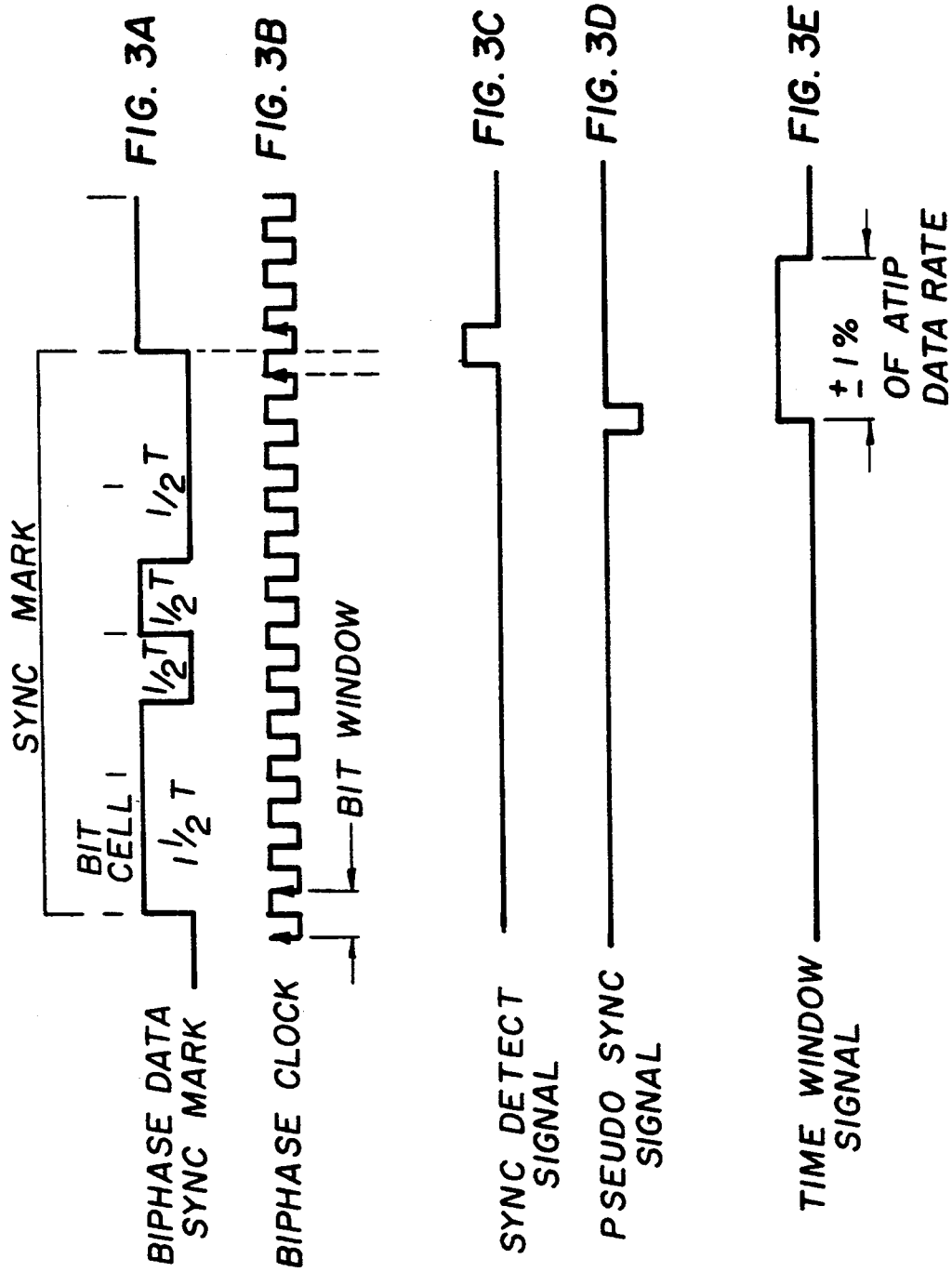
FIGS. 3A-3E represent different signals illustrating the generation of synchronization signals according to the invention.
Figure 4:
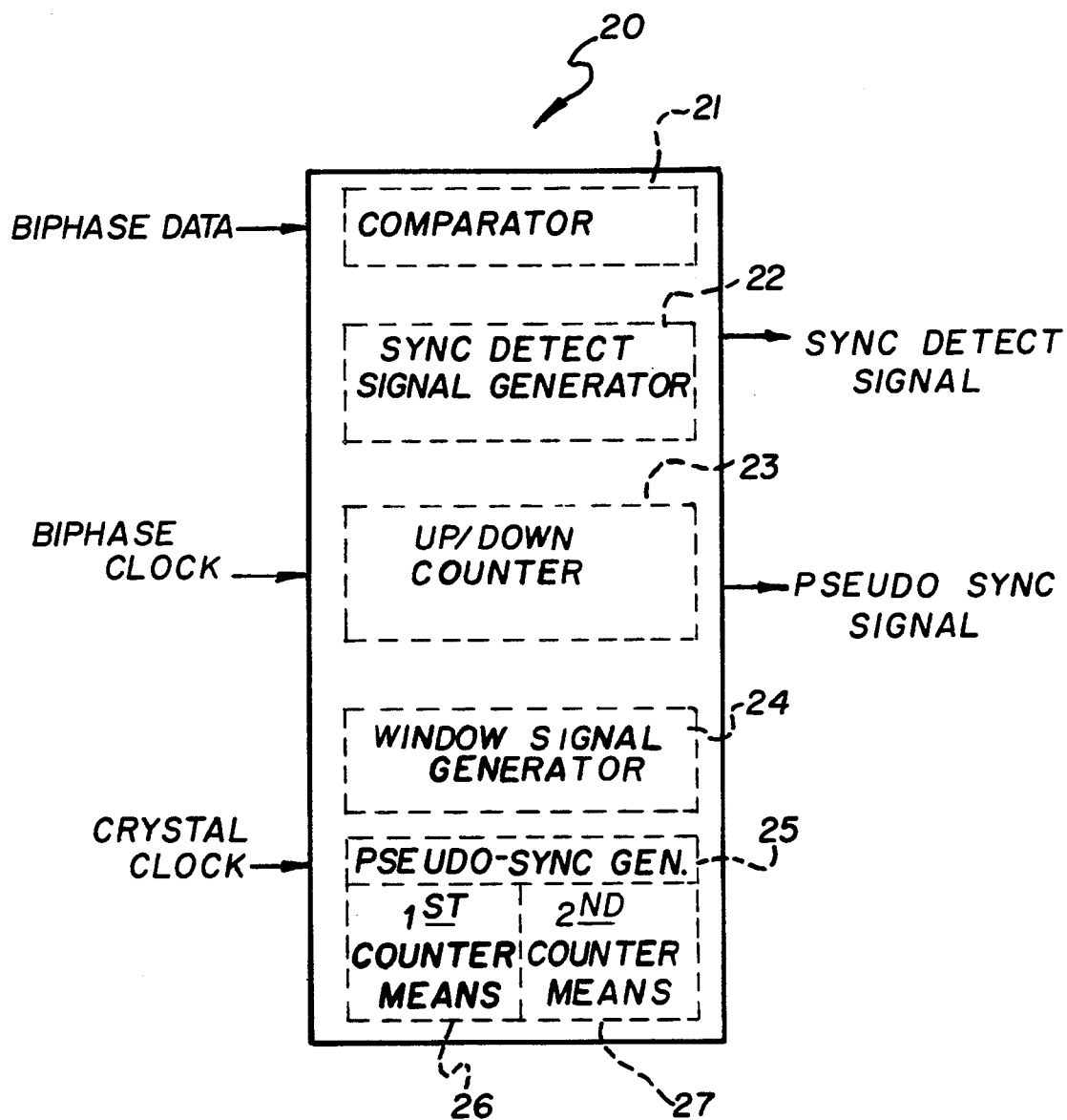
FIG. 4 schematically represents a block diagram of the sync detection block used in the apparatus according to the invention.

As shown in FIG. 3A, and as already mentioned, the sync mark is detected by using a third "illegal" length (1½T) for coding the sync mark signal, the other data in a block being coded by using two "legal" lengths (1 T; ½ T). The sync detection block 20, as illustrated in FIG. 4, in response to the biphase data and the biphase clock signal, outputs a sync detect signal (FIG. 3C) after the end of the sync mark signal of a given block (FIG. 3A) and also a pseudo-sync signal (FIG. 3D) which occurs in the next block at a predetermined time after the end of the sync detect signal. Typically, for a 6× writer, the pseudo-sync signal is generated approximately 2.19 ms after the sync detect signal occurs. This pseudo sync signal is a continuously repeatable signal which occurs regardless of whether the system sees a sync detect signal or not. Such a pseudo-sync signal indicates that a previous block has been completed and permits the loading of the registers internally in the ATIP circuitry so that the microprocessor can read the registers.

Typically, as shown in FIG. 4 the sync detection block comprises a digital comparator 21 circuit that recognizes the sync mark pattern and generates a sync detect signal (FIG. 3C) after the end of the sync mark signal by means of a sync detect signal generator 22. According to a preferred embodiment, the sync detect signal occurs shortly before the physical end of the sync mark (for example, about 6.6 μs before the physical end of the sync mark signal). As a way of example, the detection circuitry consists of a 16 bit shift register and a 16 bit magnitude comparator 21. As the biphase data in FIG. 2B is clocked into the shift register, the comparator looks for a pattern similar to a predetermined sync mark. If a pattern match occurs a sync detect pulse (FIG. 3C) is output. For example, for a 6× CD data rate, the sync detect signal should occur every 2.22 ms.

Figure 5:
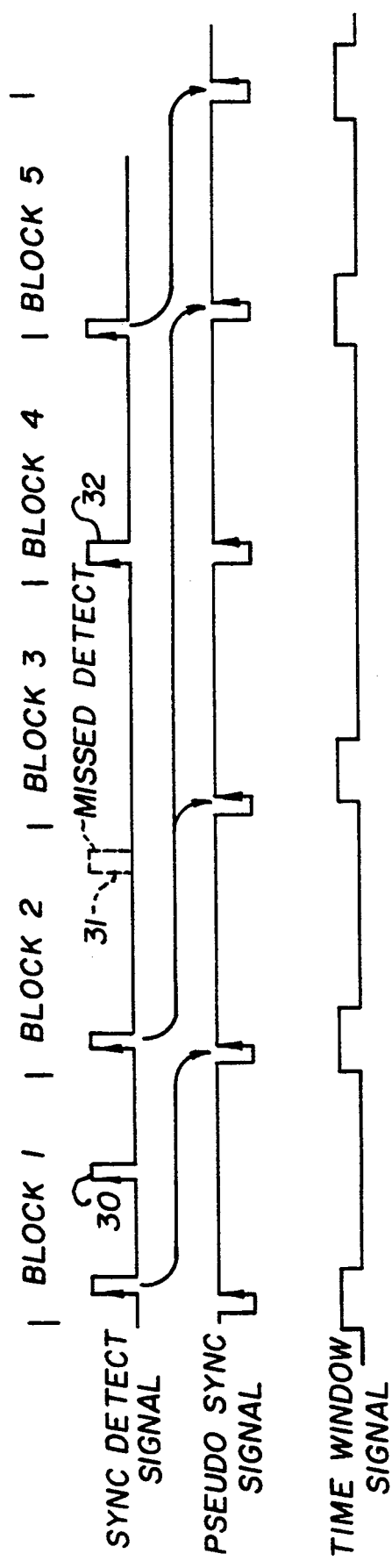
FIG. 5 shows a timing diagram illustrating the process used for generating synchronization signals from missing or invalid sync detect signals.

The sync detect signal is an unprocessed signal, therefore, false sync detect signals due to noise or misplaced data edges may occur. Conversely, sync mark signals may not be detected for the same reasons. To increase reliability and ATIP channel robustness, the sync detect signal is subjected to some scrutiny. First, for a given block of information, a time window signal (FIG. 3E) is developed from a valid sync detect signal in the block of information preceding the given block. The window signal is generated by a time window counter 24 and is designed to occur in the exact location where the next valid sync detect signal should occur. The window width, according to a preferred embodiment, is equivalent to ± 1% of the nominal data rate. If the sync detect signal does not occur in the window, the sync detect signal is ignored. Such a procedure is illustrated in FIG. 5 where an invalid detect signal 30 (i.e. outside the time window signal) is ignored.

As can be seen, the sync detect signal of a given block n is used to produce the pseudo-sync signal of the block n+1. Preferably, the pseudo-sync signal of the block n+1 is generated prior to the sync detect signal corresponding to the block n+1. As shown in FIG. 5 there is a missed sync detect signal for the block 3. In this case, as already explained, the pseudo sync signal for the block 4 is generated from the last valid sync detect signal, i.e. the sync detect signal of block 2. As it appears in FIG. 5, the missed sync detect signal 31 generates no time window signal, so that the sync detect signal in block 4 is not considered as valid (since it doesn't occur during a window signal). Accordingly, the pseudo-sync signal of block 5 is also generated from the sync detect signal of block 2. These pseudo-sync signals are generated by an ATIP pseudo-sync signal generation circuit 25 which, in fact, includes two counters 26, 27. In order for the microprocessor to read the status registers which will be discussed in detail hereafter, and for the EFM (eight out of fourteen modulation) encoder to initiate a write sequence if needed, circuitry is necessary to generate a continuously occurring pseudo-sync signal from each sync detect signal. To do this, the sync detect signal is input to a first counter 26. At its predetermined terminal count, an ATIP pseudo-sync pulse is output. If a sync mark is not detected, a second counter 27, which is linked to the last valid sync detect signal, runs to its predetermined terminal count and injects an ATIP pseudo-sync signal until a valid sync detect signal occurs or until the microprocessor determines that too many consecutive sync marks were missed. In this case, the microprocessor indicates a system error which stops the writing/reading process.

Also shown in FIG. 4, as an input signal of the sync detection block 20, is a crystal clock which is used as a high frequency clock for timing generation and acts as a reference clock. Typically, for a 6× writer, its frequency is 12.9 MHz.

Figure 6:
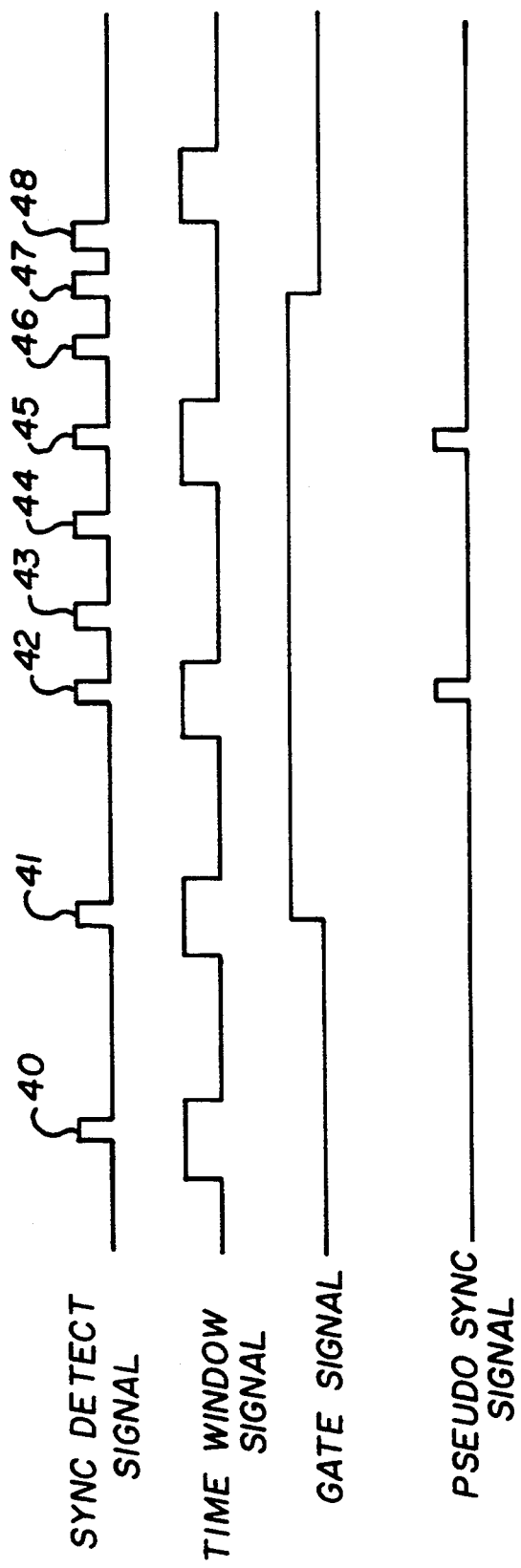
FIG. 6 shows a timing diagram illustrating the windowing strategy used in accordance with the present invention.

Advantageously, and as shown in FIG. 4, an up-/down counter 24 is configured to provide an additional level of filtering by setting a requirement of a predetermined number of valid sync detect signals before starting to write/read on the disk. To this end an up/down counter 23 is decremented if a sync detect signal occurs outside the window or incremented if the sync detect occurs within the window. This is illustrated in FIG. 6 of the present description. The up/down counter 24 is first initialized to a programmed state which is incremented each time a valid sync detect signal is detected and decremented each time an invalid or missing sync detect signal is detected. The counter increments to a specified threshold count at which it resets to the programmed state if a string of valid sync detect signals occur in the appropriate location (40, 41, 42, 45); i.e. inside the time window. Once a given number of valid sync detect signals occur (2 in the example shown in FIG. 6), a gate signal is opened which allows the next valid sync detect signal to initiate the write or read cycle. If a string of valid sync detect signals is not detected (43, 44; 46, 47, 48), the counter decrements for each missing or invalid sync detect signal. When the zero count is reached, the circuitry inhibits any sync detect signal output to the ATIP pseudo-sync generation circuitry by closing the gate. This condition is detected by the microprocessor 8 and consequently, the "write" or "read" process is stopped. The main feature of the up/down counter is actually performed during initialization. In the example shown in FIG. 6, the counter requires two genuine sync detect signals (40, 41) to occur in succession before the ATIP pseudo-sync generation circuit is allowed to synchronize. This requirement prevents synchronization on false sync detect signal detection.

As shown in FIG. 1, the sync detection block is also used for generating a servo sync signal which is used to provide additional control of the spindle speed of the writer/reader while writing. Such a servo sync track signal provides means to control the phase difference between the sync detect signal and the EFM encoder sync signal while writing on the disk.

The system shown in FIG. 1 also comprises an ATIP decoder 7 which generates the address information and status information necessary for the microprocessor 8 to determine whether there is a problem or not. The ATIP decoder includes a biphase-NRZ decoder (mentioned herebefore), status and address registers (minutes; seconds; frames) and CRC circuitry which flags a status bit each time an error is detected in the address. The ATIP decoder decodes the address information provided by the biphase data PLL 4 and by the biphase clock PLL and provides status information to the microprocessor. From that status and address, the processor determines whether writing should be started, stopped or continued. To this end, a counter in the processor (not shown) is used which is incremented each time a good valid address with a proper status is seen by the ATIP decoder 7 and decremented each time a poor status or invalid address is seen by the ATIP decoder 7. When the counter reaches the zero count, the processor stops the writing process. A system error is indicated. A write sequence is started once a predetermined count has been reached. According to one embodiment, a write sequence is started as soon as the counter contains a value different from zero.

The invention which has been described in detail in the foregoing description is particularly advantageous in that it provides the capability to process and detect the ATIP synchronization marks at a 2× or a 6× CD rate. The circuitry also provides means to eliminate false sync detection by generating a ±1% window signal around the desired location of a sync detect signal. Last but not least, the circuitry provides means to generate an uninterrupted pseudo-sync signal from an actual sync mark detection. The pseudo-sync signal occurs in the appropriate location, even if no valid sync detect signal is detected.

While the invention has been described with particular reference to a preferred embodiment, it will be understood by those skilled in the art that various changes may be made and equivalents may be substituted for elements of the preferred embodiments without departing from the claimed invention.

PARTS LIST

1 CD-WO disk
2 reader/writer
3 ATIP filter
4 demodulator phase lock loop
5 biphase clock phase lock loop
7 ATIP decoder
8 microprocessor
10 ½ T data
11 1 T data
20 sync detection block
21 digital comparator
22 sync detect signal generator
23 up/down counter
24 window signal generator 26 first counter
27 second counter
30 invalid detect signal
31 missed sync detect signal
40 valid sync detect signal
41 valid sync detect signal
42 valid sync detect signal
45 valid sync detect signal
43 missing/invalid sync detect signal
44 missing/invalid sync detect signal
46 missing/invalid sync detect signal
47 missing/invalid sync detect signal
48 missing/invalid sync detect signal

I claim:

1. A method for detecting and processing synchronization marks extracted from a prerecorded wobbled groove formed in a compact disk in order to produce pseudo-sync signals, each pseudo-sync signal enabling a writing sequence on said compact disk of an associated writer, said prerecorded wobbled groove having a plurality of blocks of information, said method comprising the steps of:

(a) extracting an FM signal from the wobbled groove when the disk is rotatably driven and converting such FM signal into biphase data;

(b) extracting a clock signal from the biphase data;

(c) detecting in each block of information a predetermined sequence of biphase data representing a sync mark by using the clock signal and the biphase data to produce a sync detect signal;

(d) generating a time window signal in which, for a given block of information, a valid sync detect signal is expected to occur, said time window signal being generated from a valid sync detect signal of the block preceding said given block;

(e) in response to a valid sync detect signal detected within the window signal of a given block of information, generating a pseudo-sync signal in the next block of information;

(f) in the case of no valid sync detect signal within the window signal of said given block of information, generating a pseudo-sync signal in the next block of information from the last valid sync detect signal; and (g) indicating a system error when a predetermined number of sync detect signals are not detected within their corresponding time window signal.

2. The method of claim 1 comprising the further step of detecting a predetermined number of valid sync detect signals before generating said pseudo-sync signal.

3. An apparatus for detecting and processing synchronization marks extracted from a prerecorded wobbled groove formed in a compact disk in order to produce pseudo-sync signals, each pseudo-sync signal enabling a writing sequence on said compact disk of an associated writer, said prerecorded wobbled groove having a plurality of blocks of information, said apparatus comprising:

(a) means for extracting an FM signal from the wobbled groove when the disk is rotatably driven and converting such FM signal into biphase data;

(b) means for extracting a clock signal from the biphase data;

(c) means for detecting in each block of information a predetermined sequence of biphase data representing a sync mark by using the clock signal and the biphase data to produce a sync detect signal;

(d) means for generating a time window signal in which, for each block of information, a valid sync detect signal is expected to occur, said time window signal being generated from the last valid sync detect signal;

(e) means for, in response to a valid sync detect signal detected within the window signal of a given block of information, generating a pseudo-sync signal in the next block of information;

(f) means for, in the case of no valid sync detect signal within the window signal of said given block of information, generating a pseudo-sync signal in the next block of information from the last valid sync detect signal; and (g) means for indicating a system error when a predetermined number of sync detect signals are not detected within their corresponding time window signal.

4. The apparatus of claim 3 further comprising means for detecting a predetermined number of valid sync detect signals before generating said pseudo-sync signal.

5. The apparatus of claim 4 wherein said detecting means comprises an incrementing/decrementing counter.

* * * * *